(12) United States Patent
Thomas et al.

(10) Patent No.: US 8,797,772 B2
(45) Date of Patent: Aug. 5, 2014

(54) LOW NOISE VOLTAGE REGULATOR

(75) Inventors: Teddy D. Thomas, Bedford, NH (US);
Gregory Stewart Waterfall, Tucson, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 283 days.

(21) Appl. No.: 13/173,217

(22) Filed: Jun. 30, 2011

(65) Prior Publication Data
US 2013/0002218 A1    Jan. 3, 2013

(51) Int. Cl.
*H02M 7/48* (2006.01)

(52) U.S. Cl.
USPC ............................. 363/71; 72/19.8

(58) Field of Classification Search
USPC ......... 323/222, 224, 271–276, 280, 311–316;
363/16–17, 20, 25, 49, 55, 65, 71;
330/69, 91, 150, 199, 174, 149, 289,
330/307, 271, 265, 295; 72/15.1, 16.1, 351,
72/436, 438, 445, 450
See application file for complete search history.

(56) References Cited

U.S. PATENT DOCUMENTS

| | | | | |
|---|---|---|---|---|
| 4,069,697 A | * | 1/1978 | Morrison et al. | 72/19.8 |
| 4,866,295 A | * | 9/1989 | Leventis et al. | 307/43 |
| 4,886,295 A | * | 12/1989 | Browne | 280/777 |
| 5,627,460 A | * | 5/1997 | Bazinet et al. | 323/288 |
| 6,188,877 B1 | * | 2/2001 | Boesch et al. | 455/74 |
| 6,396,252 B1 | * | 5/2002 | Culpepper et al. | 323/285 |
| 6,583,664 B2 | * | 6/2003 | Mathe et al. | 330/10 |
| 6,734,724 B1 | * | 5/2004 | Schell et al. | 330/10 |
| 6,833,757 B2 | | 12/2004 | Stephens et al. | |
| 7,292,015 B2 | | 11/2007 | Oswald et al. | |
| 7,486,058 B2 | | 2/2009 | Szepesi | |

OTHER PUBLICATIONS

Ronan A. R. Van Der Zee and Ed (A. J. M.) Van Tuijl; A Power-Efficient Audio Amplifier Combining Switching and Linear Techniques; IEEE Journal of Solid-State Circuits; Jul. 1999; p. 985-991; vol. 34, No. 7.

R. A. R. Van Der Zee and A. J. M. Van Tuijl; A High Efficiency Low Distortion Audio Power Amplifier; Journal of the Audio Engineering Society; Presented at the 103rd Convention Sep. 26-29, 1997 New York; An Audio Engineering Society Preprint; p. 1-15; Audio Engineering Society; NewYork, NewYork, USA.

Jinseong Jeong, Donald F. Kimball, Myoungbo Kwak, Paul Draxler, Chin Hsia, Craig Steinbeiser, Thomas Landon, Oleh Krutko, Lawrence E. Larson and Peter M. Asbeck; High-Efficiency WCDMA Envelope Tracking Base-Station Amplifier Implemented With GaAs HVHBTs; IEEE Journal of Solid-State Circuits; Oct. 2009; p. 2629-2639; Vol. 44, No. 10.

(Continued)

*Primary Examiner* — Rajnikant Patel
(74) *Attorney, Agent, or Firm* — William B. Kempler; Frederick J. Telecky, Jr.

(57) ABSTRACT

A low noise voltage regulator generally includes an output switching stage and an amplifier, both of which contribute current to produce an output voltage at a substantially constant level. The amplifier produces a current that is based on a difference between a reference voltage and a feedback of the output voltage. The current from the amplifier (and optionally also from a current ramp generator) counterbalances the current from the output switching stage to maintain the output voltage at the substantially constant level. The output switching stage is controlled in response to a level of the counterbalancing current.

19 Claims, 9 Drawing Sheets

(56) References Cited

OTHER PUBLICATIONS

LM2575, 1.0 A, Adjustable Output Voltage, Step-Down Switching Regulator; May 2004; p. 1-27; Semiconductor Components Industries, LLC; Denver, Colorado, USA; http://www.onsemi.com/litorder.

LM2575, 1-A Simple Step-Down Switching Voltage Regulator; SLVS569D—Jan. 2005—Revised Jul. 2005; p. 1-13; Texas Instruments Incorporated; www.ti.com; Dallas, Texas, USA.

TPS54160, 1.5-A, 60-V, Step-Down Swift™ DC/DC Converter With Eco-Mode™; SLVS795C—Oct. 2008—Revised Oct. 2010; p. 1-52; Texas Instruments Incorporated; www.ti.com; Dallas, Texas, USA.

* cited by examiner

LOW NOISE VOLTAGE REGULATOR

BACKGROUND OF THE INVENTION

A voltage regulator power supply is typically used to ensure that the electrical power supplied to an electronic device is maintained at a relatively constant voltage while providing the (variable) current needed for the proper functioning of the electronic device. There are several types, or topologies, of voltage regulators, each with different advantages and disadvantages. Design considerations for selecting the type of voltage regulator to use in a given situation often involve tradeoffs between parameters such as conversion efficiency and output voltage noise. The efficiency generally refers to the amount of power that can be provided by the regulator with a given input power. The noise generally refers to any fluctuation, including "ripple", exhibited by the output voltage, usually during steady state operating conditions, but also when changes occur in either the available input line voltage or the output load current draw.

A linear regulator is a type of voltage regulator that provides an output voltage with relatively low noise. A low-dropout (LDO) linear regulator, for instance, may be capable of as little as a 500 microvolt ripple in a 5-Volt output, i.e. about 0.01% noise. The efficiency of such regulators, however, is typically relatively low, since they ineffectively convert input power to output power, the wasted energy being dissipated as heat. For instance, a linear regulator with a high input voltage (e.g. Vin about 12 Volts) and a low output voltage (e.g. Vout about 5 Volts) is typically less than 50% efficient.

A switching power supply (e.g. a buck converter, a step-down DC to DC converter, a switched-mode power supply, etc.), on the other hand, is typically very efficient, usually 90-95% (or higher) efficient. The noise, however, can be quite significant. A switching power supply that produces 5 Volts, for example, may exhibit a total peak-to-peak ripple of anywhere from 5 to 200 millivolts, i.e. 0.1 to 4% noise.

Figure 1:
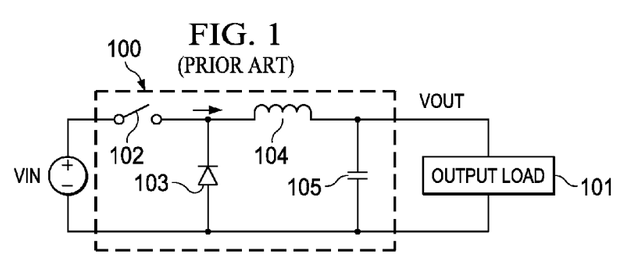
FIG. 1 is a simplified schematic diagram of a prior art switching power supply.
Figure 2:
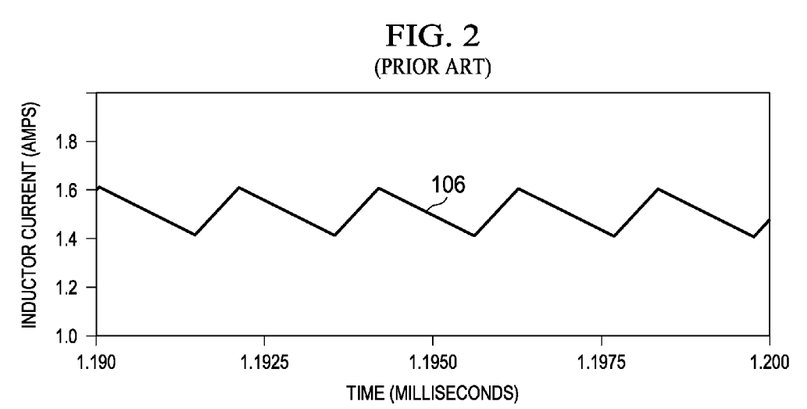
FIG. 2 is a simplified graph of a current in an inductor in the prior art switching power supply shown in FIG. 1.

FIG. 1 shows a simple example of a prior art switching power supply (buck converter 100) that converts a given input voltage Vin to an appropriate output voltage Vout for an output load 101. The buck converter 100 generally includes a switch 102, a diode 103, an inductor 104 and a capacitor 105 configured as shown. An appropriate control component (not shown) typically controls the switch 102, based on feedback of the output voltage Vout. When the switch 102 is closed, the input power (at voltage Vin) provides current to the inductor 104, so the current in the inductor 104 increases. When the switch 102 is open, the current to the inductor 104 (provided through the diode 103) decreases. A graph 106 illustrating this increasing and decreasing (ripple) of the current in the inductor 104 is shown in FIG. 2. In this example, the current in the inductor 104 fluctuates about 200 milliamps around 1.5 Amps. As a consequence of the current ripple in the inductor 104, the output voltage Vout ripples accordingly, as shown in a graph 107 in FIG. 3. The output voltage Vout fluctuates about 8 millivolts around about 3.29 Volts, which calculates to about 0.24% noise.

A more complicated intermediary solution to improve both efficiency and noise reduction involves a combination of a switching power supply and an LDO regulator. The switching power supply generally takes an input voltage down to a lower intermediate voltage with a relatively high efficiency, but with an undesirably high noise level. The LDO regulator then takes the lower intermediate voltage and produces the desired low noise output voltage. Since the LDO regulator starts with a lower voltage, the loss in the LDO regulator is smaller than in solutions that use only the LDO regulator. Thus, the end result of this combination has a greater efficiency (about 75% or less) than an LDO regulator alone and a lower noise level than a switching power supply alone. A disadvantage is, however, that a device manufacturer often must use two components (the switching power supply and the LDO regulator) instead of one, thus increasing the size, complexity and cost of the resulting device.

A continuing trend in the electronics industry is the need for ever greater conversion efficiency combined with ever lower operating voltage noise levels in addition to ever smaller device/component sizes and costs. Current technology is reaching the limits of the efficiency and noise capabilities of the available power supply topologies. A new topology is needed.

It is with respect to these and other background considerations that the present invention has evolved.

SUMMARY OF THE INVENTION

The present invention introduces a new power supply topology with a conversion efficiency approaching that of a switching power supply and an output voltage noise level equivalent to, or approaching, that of a linear regulator. The present invention is embodied in an electronic device that generally includes an output switching stage and an amplifier, both of which contribute current to produce an output voltage at a substantially constant level. The amplifier produces a current that is based on a difference between a reference voltage and a feedback of the output voltage. The current from the amplifier counterbalances the current from the output switching stage to maintain the output voltage at the substantially constant level. The output switching stage is controlled in response to a level of the counterbalancing current.

Some embodiments include a current ramp generator connected to the amplifier and the output switching stage. The current ramp generator is preferably activated and deactivated in response to the output switching stage being deactivated and activated, respectively. A current from the current ramp generator preferably forms the counterbalancing current in combination with the current from the amplifier.

In some embodiments, the output switching stage includes a step down Buck regulator. In other embodiments, the output switching stage includes an isolated forward converter regulator. Still other embodiments may incorporate other appropriate types of switching stages.

In some embodiments, the output voltage exhibits less than about 0.002% (or about 0.001% to 0.0015%, or less than 50 microvolts) of voltage ripple around a desired voltage level. Additionally, in some embodiments, the output voltage is produced with an efficiency of greater than about 80% (or about 80% to 85% or even greater). Furthermore, in some embodiments, when the output current is below a light load threshold level, the output switching stage is not switched on.

A more complete appreciation of the present disclosure and its scope, and the manner in which it achieves the above noted improvements, can be obtained by reference to the following detailed description of presently preferred embodiments taken in connection with the accompanying drawings, which are briefly summarized below, and the appended claims.

DETAILED DESCRIPTION OF THE INVENTION

Figure 4:
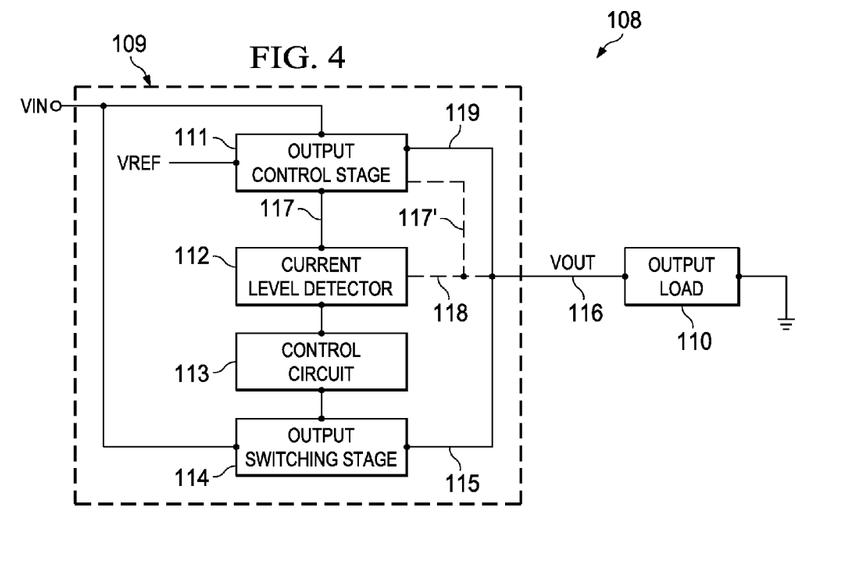
FIG. 4 is a simplified schematic diagram of an electronic device incorporating an embodiment of the present invention.

An electronic device 108 incorporating an embodiment of the present invention is shown in FIG. 4. The electronic device 108 generally includes a voltage regulator 109 and an output load 110. The voltage regulator 109 generally receives an input voltage Vin and produces therefrom a low noise output voltage Vout. The conversion from the input voltage Vin to the output voltage Vout is done with an efficiency approaching that of a switching power supply, e.g. greater than about 80% (or about 80% to 85% or even greater). Additionally, the output voltage Vout exhibits a noise level equivalent to, or approaching, that of a linear regulator. In some embodiments, the output voltage Vout exhibits less than about 0.002% (or about 0.001% to 0.0015%, or less than 50 microvolts) of voltage ripple around a desired voltage level, as will be described below.

The output load 110 preferably represents a variety of components that perform the primary functions of the electronic device 108 under the power of the output voltage Vout. The voltage regulator 109 generally includes an output control stage 111, a current level detector 112, a control circuit 113 and an output switching stage 114. The output switching stage 114 is based on any appropriate switching type of voltage regulator, such as a step down Buck regulator, an isolated forward converter regulator, etc.

The output control stage 111, the current level detector 112 and the control circuit 113 operate together to control the output switching stage 114 to produce (on line 115) a portion of the output current (on line 116) for the output voltage Vout. In so doing, the output control stage 111 (as either a current source or a current sink) produces an additional portion of the output current (on line 117, through the current level detector 112 and line 118, or on line 117'). In general, the output switching stage 114 contributes a major portion (sometimes greater than 100% when the output control stage 111 is a current sink) of the current provided by the voltage regulator 109 to the output load 110, and the output control stage 111 contributes a minor portion of the output current (except when approaching "light load" conditions, as described below). Additionally, this topology is not simply a switching power supply with an LDO regulator, as in the prior art, but is a more integrated approach that has fundamentally different performance metrics.

The output control stage 111 generally receives a feedback (on line 119) of the output voltage Vout. When the feedback on line 119 decreases or increases relative to a reference voltage Vref, the output control stage 111 responds by increasing or decreasing, respectively, its contribution to the output current. The current level detector 112 (directly or indirectly) senses the level of the current supplied by the output control stage 111 and produces an output that is relative to the magnitude of the sensed current. With the output from the current level detector 112, the control circuit 113 produces an output that switches on and off the output switching stage 114 depending on the level of the sensed current. The output switching stage 114 ramps its contribution to the output current up and down in response to being switched on and off, respectively. The up and down ramping of the current from the output switching stage 114 causes the output voltage Vout to ripple slightly, which affects the output control stage 111 as mentioned, thus completing the control cycle.

The output control stage 111, thus, generally controls the level of the output voltage Vout based on the feedback (on line 119) of the output voltage Vout and the reference voltage Vref. In operation, according to some embodiments, the current from the output control stage 111 generally ramps up and down at about the same times that the current from the output switching stage 114 ramps down and up, respectively. The current from the output control stage 111 thus forms (at least part of) a counterbalancing current that, combined with the current from the output switching stage 114, maintains the output voltage Vout at a substantially constant level.

Figure 5:
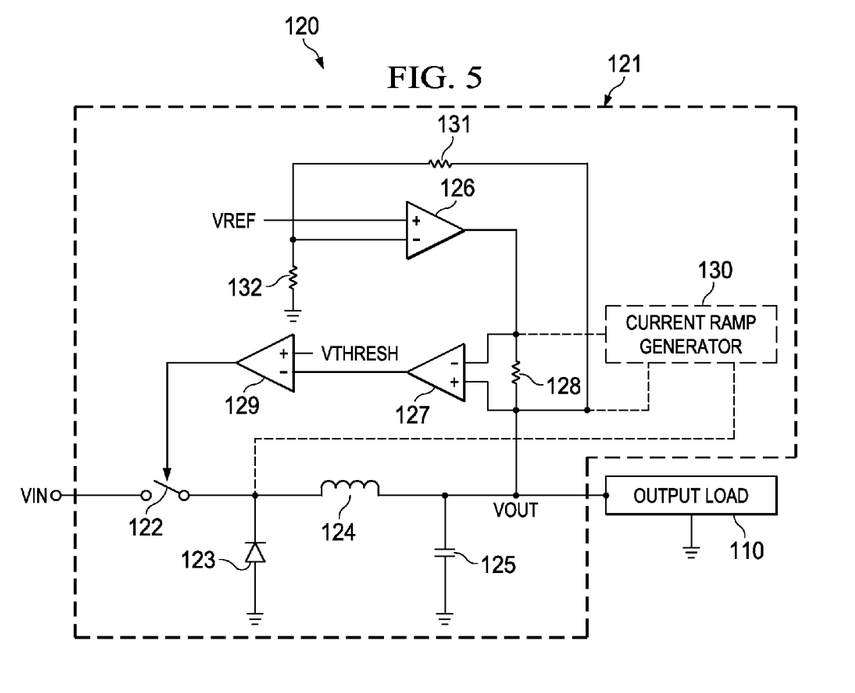
FIG. 5 is a simplified schematic diagram of a specific embodiment of the electronic device shown in FIG. 4 incorporating an embodiment of the present invention.

A more detailed, but still simplified, schematic of an embodiment of the present invention is shown in FIG. 5 as an electronic device 120 having a voltage regulator 121 and the output load 110. In this embodiment, the output switching stage 114 (FIG. 4) is based on a step down Buck regulator generally including a switch 122, a diode (or optionally a switch) 123, an inductor 124 and an output capacitor 125. The output control stage 111 generally includes an amplifier 126. The current level detector 112 generally includes a difference, or instrumentation, amplifier 127 and a sense resistor 128. The control circuit 113 generally includes a comparator 129 with a threshold voltage Vthresh. The voltage regulator 121 is also shown having an optional current ramp generator 130. Other components or details are not shown for simplicity of explanation. Additionally, other arrangements and combinations of components are possible in variations of this embodiment without departing from the general functions described herein.

When the switch 122 is closed, the input voltage Vin is applied to the inductor 124, and the current through the inductor 124 ramps up in this embodiment. When the switch 122 is open, the diode 123 commutates the current in the inductor 124, and the current through the inductor 124 ramps down. The current from the inductor 124, thus, ripples to some degree, and the output capacitor 125 filters the consequent ripple on the output voltage Vout somewhat.

The feedback of the output voltage Vout is applied (preferably through a voltage divider, resistors 131 and 132) to an inverting input of the amplifier 126 in this embodiment. The reference voltage Vref is applied to a non-inverting input of the amplifier 126. The amplifier 126, thus, generates a current (positive or negative) that is based on or relative to the difference between the feedback of the output voltage Vout and the reference voltage Vref. This current (on line 117, FIG. 4) is passed through the sense resistor 128 (and line 118) to contribute to the current at the output voltage Vout. Alternatively, this current is mirrored, and the mirror current (rather than the actual current from the amplifier 126) passes through line 117 and the sense resistor 128, while the current from the amplifier 126 contributes to the current at the output voltage Vout through line 117' (line 118 in this alternative is absent). In another alternative, the mirror current (rather than the actual current from the amplifier 126) contributes through line 117' to the current at the output voltage Vout, while the current from the amplifier 126 passes through line 117 and the sense resistor 128 (line 118 in this alternative is absent).

One end of the sense resistor 128 (connected to the output of the amplifier 126) is connected to an inverting input of the difference amplifier 127 in this embodiment. The other end of the sense resistor 128 (connected to the output voltage Vout) is connected to a non-inverting input of the difference amplifier 127. The difference amplifier 127 amplifies the voltage drop that the difference amplifier 127 senses across the sense resistor 128. The output (a voltage level) of the difference amplifier 127, thus, is based on or relative to the current through the sense resistor 128, i.e. the same as or based on or relative to the current from the amplifier 126.

The comparator 129 receives the output from the difference amplifier 127 at an inverting input and the threshold voltage Vthresh at a non-inverting input in this embodiment. The level of the threshold voltage Vthresh and a hysteresis characteristic of the comparator 129 generally determine the level of the output of the difference amplifier 127 at which the comparator 129 toggles its output on and off. The output of the comparator 129 operates the switch 122. The net result of the operation of the comparator 129 and the difference amplifier 127 is that the output of the comparator 129 turns on the switch 122 when the sensed current through the sense resistor 128 reaches an upper limit, or threshold (e.g. about 100-200 milliamps or less) and turns off the switch 122 when the sensed current through the sense resistor 128 reaches a lower limit, or threshold (e.g. about 50 milliamps or less). The comparator 129 preferably has a sufficient hysteresis to enable an appropriate gap between the upper and lower limits to enable optimum operation of the voltage regulator 121. The hysteresis (along with the speed of the current ramp in the inductor 124, among other parameters) generally determines the frequency with which the comparator 129 toggles its output and, thus, the frequency of the ripple (or the switching frequency) in the currents from the inductor 124 and the amplifier 126.

Part of the function of the comparator 129 and difference amplifier 127 serves to limit the amount of current that the amplifier 126 contributes to the overall output current of the voltage regulator 121. The amount of this current contribution is generally dependent on selection of values for the resistance of the sense resistor 128, the gain of the difference amplifier 127, the voltage level of the threshold voltage Vthresh and the hysteresis of the comparator 129, among other parameters. The efficiency of the amplifier 126 (i.e. the output control stage 111, FIG. 4) is approximately the output voltage Vout divided by the input voltage level (not shown) supplied to the amplifier 126. This efficiency can be relatively low. However, since the amplifier 126 preferably contributes only a minor portion of the output current (under most operating conditions), the relatively low efficiency of the amplifier 126 has a relatively small impact on the overall efficiency of the voltage regulator 121. A smaller current from the amplifier 126 generally translates to a greater overall efficiency of the voltage regulator 121.

Upon start up of the electronic device 120 and the voltage regulator 121, since there is initially no current in the inductor 124, the current from the amplifier 126 ramps up very quickly in order to satisfy the initial current needs of the output load 110. As the current from the amplifier 126 increases, the sense resistor 128 and the difference amplifier 127 detect the level of this current and eventually cause the comparator 129 to turn on the switch 122. The current through the inductor 124 then begins to quickly ramp up. As the current from the inductor 124 increases, less and less current is required from the amplifier 126, so the current from the amplifier 126 ramps down until the sense resistor 128 and the difference amplifier 127 cause the comparator 129 to turn off the switch 122. When the switch 122 is turned off, the current through the inductor 124 ramps down, resulting in another ramping up of the current from the amplifier 126. After some initial overshooting, the voltage regulator 121 settles into a steady state in which the combination of the currents from the inductor 124 and the amplifier 126 remains relatively constant, thereby maintaining the output voltage Vout at a substantially constant level. The currents from the inductor 124 and the amplifier 126, thus, ramp substantially opposite each other, or almost exactly out of phase in this embodiment.

The output voltage Vout generally depends on the reference voltage Vref and the voltage divider (resistors 131 and 132). The level of the output voltage Vout, thus, is set by selecting the level of the reference voltage Vref and the resistances of the resistors 131 and 132.

The amplifier 126 is preferably selected to have sufficient GBW (gain-bandwidth) to track the current from the inductor 124 at the speed of a typical switching regulator, e.g. about 100 KHz or more. A lower GBW for the amplifier 126, on the other hand, generally results in a larger ripple on the output voltage Vout.

One way to reduce the tracking demand on the amplifier 126 is to use the optional current ramp generator (CRG) 130 to cancel out the majority of the ripple in the current from the inductor 124. The CRG 130 preferably employs a feed forward technique. The CRG 130 generally receives a first input that is connected between the switch 122 and the inductor 124 and a second input that is connected to the output voltage Vout. Also, the CRG 130 generally produces a current (positive or negative) at an output connected between the amplifier 126 and the sense resistor 128. The current from the CRG 130 is thus added to the current from the amplifier 126 before passing through the sense resistor 128, so the current sensed by the sense resistor 128 and the difference amplifier 127 is the combined currents from the CRG 130 and the amplifier 126. (Alternatively, a mirror of the combined currents from the CRG 130 and the amplifier 126 is passed through the sense resistor 128) The inputs to the CRG 130 enable the CRG 130 to ramp its output current up and down almost exactly out of phase with the current from the inductor 124. The current from the CRG 130 thus reduces the amount of output current swing the amplifier 126 is required to deliver. In other words, the currents from the amplifier 126 and the CRG 130 form the counterbalancing current that, combined with the current from the inductor 124 (i.e. from the output switching stage 114, FIG. 4), maintains the output voltage Vout at a substantially constant level. In some embodiments that include the optional CRG 130, the ripple in the output voltage Vout can be reduced by an additional order of magnitude over embodiments that do not include the CRG 130.

Figure 6:
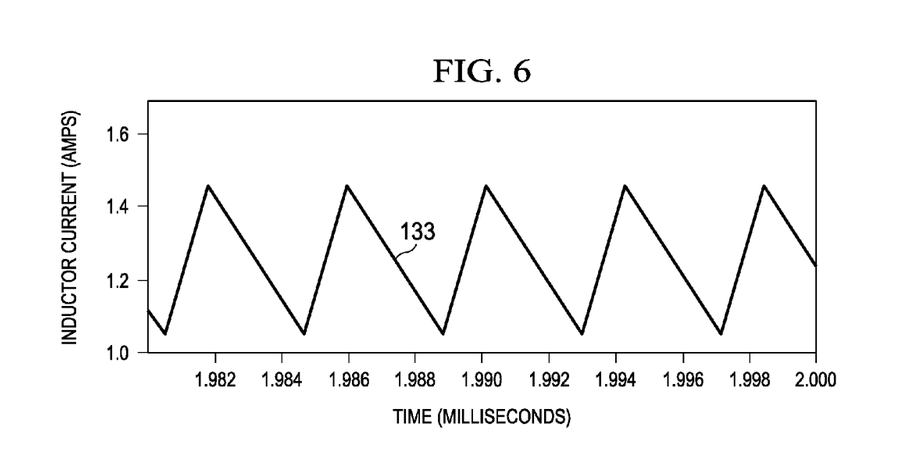
FIG. 6 is a simplified graph of a current in an inductor in the electronic device shown in FIG. 5 according to an embodiment of the present invention.

FIGS. 6-23 illustrate the results of various simulations performed on circuits that are based on embodiments of the electronic device 120 (FIG. 5). Graphs 133 and 134 in FIGS. 6 and 7, respectively, for example, are to be compared with the prior art graphs 106 and 107 in FIGS. 2 and 3, respectively. Graph 133 shows the current from the inductor 124, and graph 134 shows the output voltage Vout, both during steady state operation. Both sets of graphs were generated with simulations using the same input voltage Vin, same output voltage Vout and same output load 101 (FIG. 1) and 110 (FIGS. 4 and 5). Additionally, the prior art graphs 106 and 107 were generated with a simulation based on a commercially available voltage regulator (the TPS54160 Step-Down DC/DC Converter available from Texas Instruments Incorporated). The graphs 133 and 134 were generated with a simulation based on the electronic device 108/120 (FIGS. 4 and 5) including the optional CRG 130 and in which the output switching stage 114 (FIG. 4) includes components (e.g. the inductor 124, the output capacitor 125, etc., FIG. 5) similar to those used in the simulation of the commercially available voltage regulator. Furthermore, the graphs 133 and 134 are plotted roughly to the same vertical scale as the prior art graphs 106 and 107, respectively.

The inductor current graph 133 (FIG. 6) exhibits almost a 400 milliamp ripple (with a period of about 4.2 microseconds); whereas, the prior art inductor current graph 106 (FIG. 2) exhibits about a 200 milliamp ripple (with a period of about 2.1 microseconds). Even though the ripple exhibited in the inductor current graph 133 is about twice that in the prior art inductor current graph 106, the counterbalancing effect of the currents from the amplifier 126 and the CRG 130 (FIG. 5) serve to significantly reduce the ripple in the output voltage Vout. This effect is seen in the output voltage graph 134 (FIG. 7), which appears to be almost a straight horizontal line at about 3.29 Volts; whereas, the prior art output voltage graph 107 (FIG. 3) exhibits a significantly noticeable ripple (about 8 millivolts around about 3.29 Volts, or about 0.24% noise) at the same vertical scale.

Figure 3:
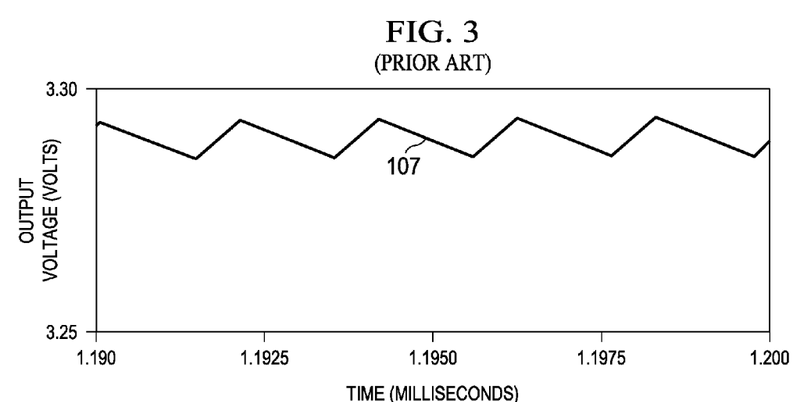
FIG. 3 is a simplified graph of an output voltage for the prior art switching power supply shown in FIG. 1.
Figure 7:
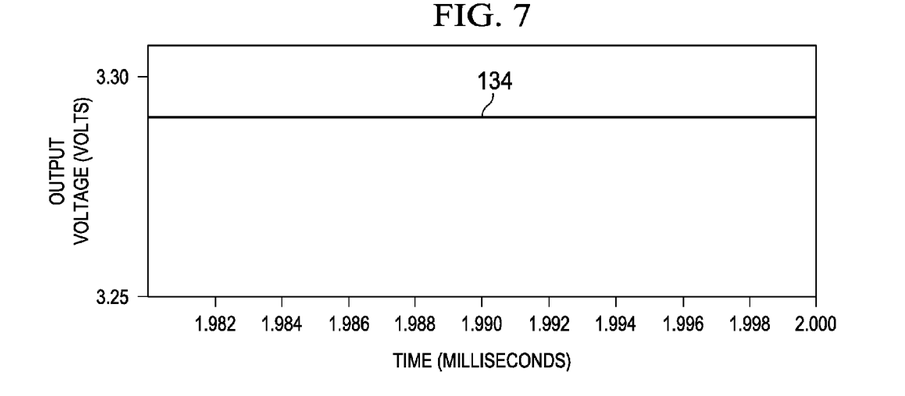
FIG. 7 is a simplified graph of an output voltage for the electronic device shown in FIG. 5 according to an embodiment of the present invention.
Figure 8:
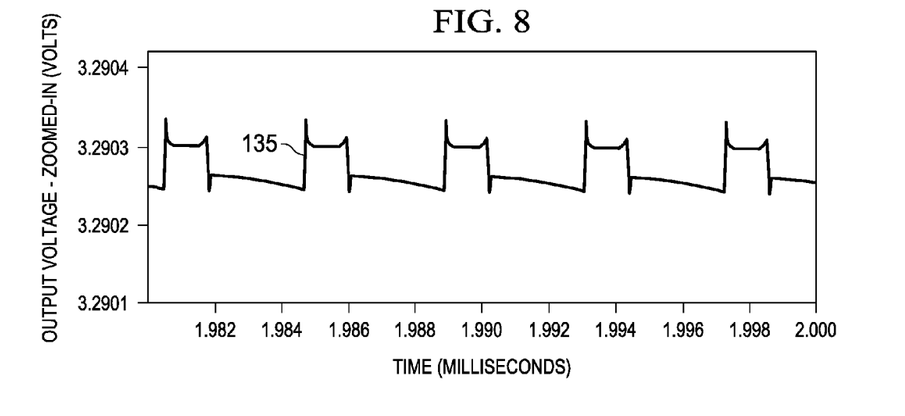
FIG. 8 is a zoomed-in version of the graph of the output voltage shown in FIG. 7 according to an embodiment of the present invention.

FIG. 8 shows a higher resolution graph 135 of the output voltage Vout for the same simulation that generated the output voltage graph 134 (FIG. 7). A ripple in the output voltage Vout can be seen at this higher resolution. This ripple is due to any errors between the currents from the inductor 124, the amplifier 126 and the CRG 130, since it is not practical to attempt to achieve perfect current ripple cancellation. The maximum ripple at this scale appears to be about 80 microvolts peak-to-peak (or about 0.0024% noise), which is about two orders of magnitude better than that of the prior art output voltage graph 107 (FIG. 3). Improvements of up to four orders of magnitude are possible with a faster amplifier 126 and/or a more accurate CRG 130, but at a loss in overall efficiency.

Figure 9:
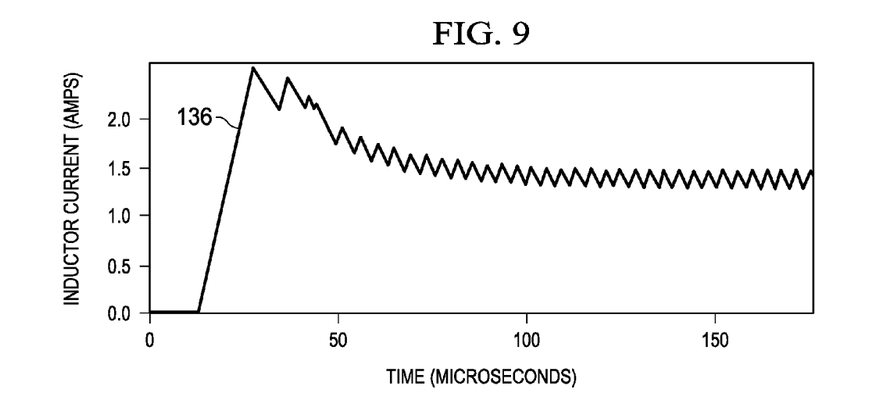
FIG. 9 is another simplified graph of a current in the inductor in the electronic device shown in FIG. 5 according to an embodiment of the present invention.
Figure 10:
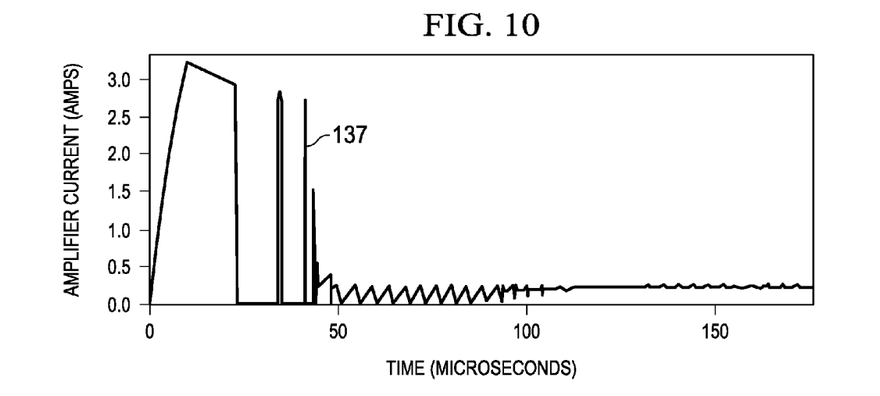
FIG. 10 is a simplified graph of a current in an amplifier in the electronic device shown in FIG. 5 according to an embodiment of the present invention.
Figure 11:
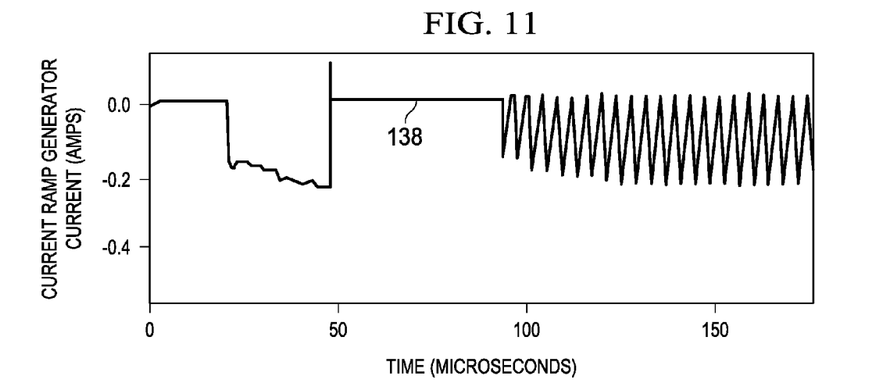
FIG. 11 is a simplified graph of a current in an optional current ramp generator in the electronic device shown in FIG. 5 according to an embodiment of the present invention.
Figure 12:
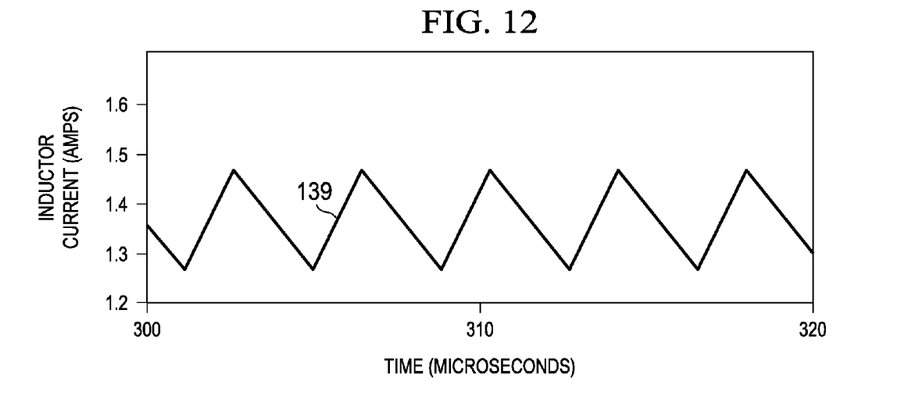
FIG. 12 is another simplified graph of a current in the inductor in the electronic device shown in FIG. 5 according to an embodiment of the present invention.
Figure 13:
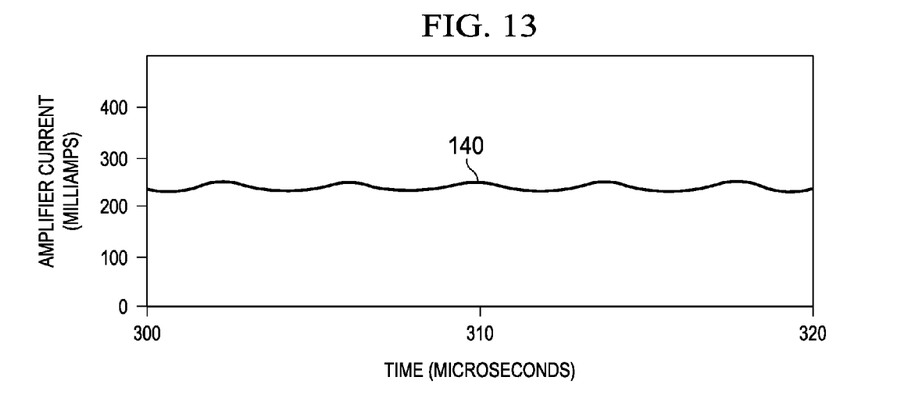
FIG. 13 is another simplified graph of a current in the amplifier in the electronic device shown in FIG. 5 according to an embodiment of the present invention.
Figure 14:
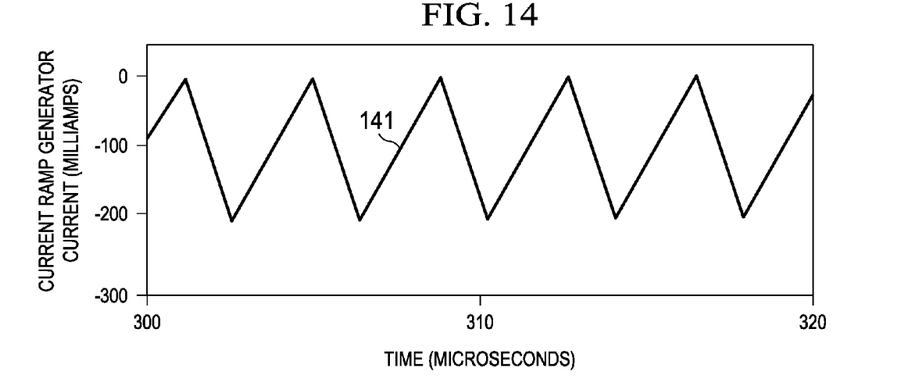
FIG. 14 is another simplified graph of a current in the optional current ramp generator in the electronic device shown in FIG. 5 according to an embodiment of the present invention.
Figure 15:
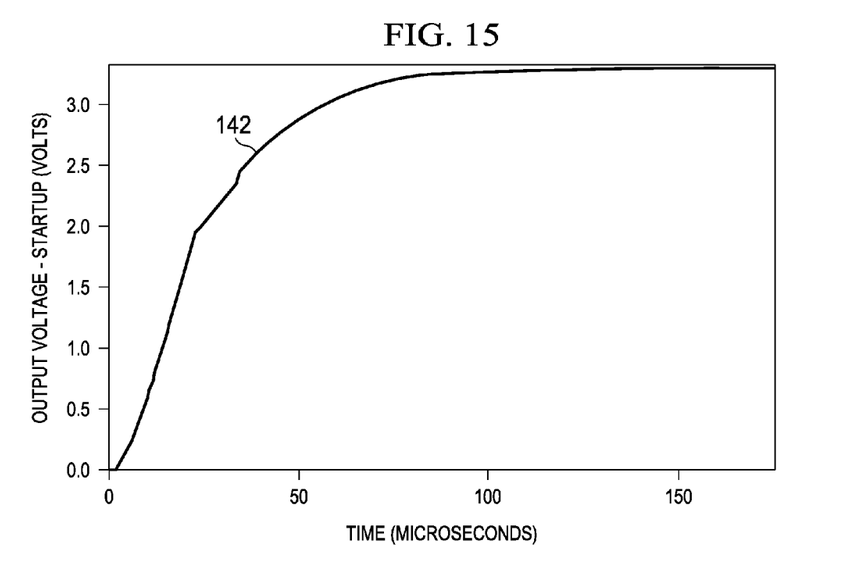
FIG. 15 is another simplified graph of an output voltage for the electronic device shown in FIG. 5 according to an embodiment of the present invention.

FIGS. 9-16 illustrate the results of another simulation performed on a circuit based on another embodiment of the electronic device 120 (FIG. 5). Graphs 136, 137 and 138 (FIGS. 9, 10 and 11, respectively) show the currents from the inductor 124, the amplifier 126 and the CRG 130, respectively, during a startup period of time as the operation of the voltage regulator 121 approaches a steady state. Graphs 139, 140 and 141 (FIGS. 12, 13 and 14, respectively) show the currents from the inductor 124, the amplifier 126 and the CRG 130, respectively, during steady state operations and at a higher resolution. Graph 142 (FIG. 15) shows the output voltage Vout during the same startup time interval as for the graphs 136, 137 and 138 (FIGS. 9, 10 and 11, respectively). Additionally, graph 143 (FIG. 16) shows the output voltage Vout during the same steady state operation time interval as for the graphs 139, 140 and 141 (FIGS. 12, 13 and 14, respectively) and at a higher resolution than that for the graph 142.

The startup graphs 136, 137, 138 and 142 (FIGS. 9, 10, 11, and 15, respectively) show that the current from the amplifier 126 (graph 137) ramps up early to provide power to the components of the electronic device 120 before the switch 122 is closed for current to be applied to the inductor 124. Then the current from the inductor 124 (graph 136) quickly ramps up, so the current from the amplifier 126 can ramp down. After some initial gyrations and overshoots, the currents quickly settle into the steady state in about 100 microseconds in this simulation. (This simulation also illustrates embodiments in which the current from the CRG (graph 138) is negative, thereby assisting in the counterbalancing of the current from the inductor 124 by sinking current, rather than sourcing current.) The net result is that the output voltage Vout (graph 142) relatively smoothly climbs to the desired level within this time period with very little noise.

Figure 16:
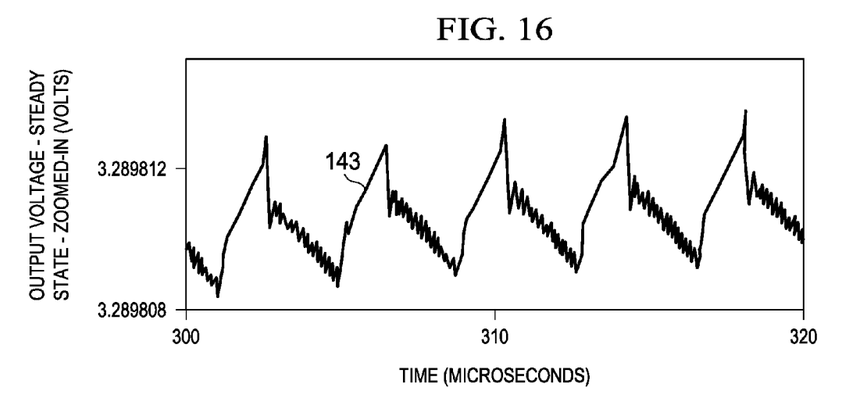
FIG. 16 is another simplified graph of an output voltage for the electronic device shown in FIG. 5 according to an embodiment of the present invention.
Figure 17:
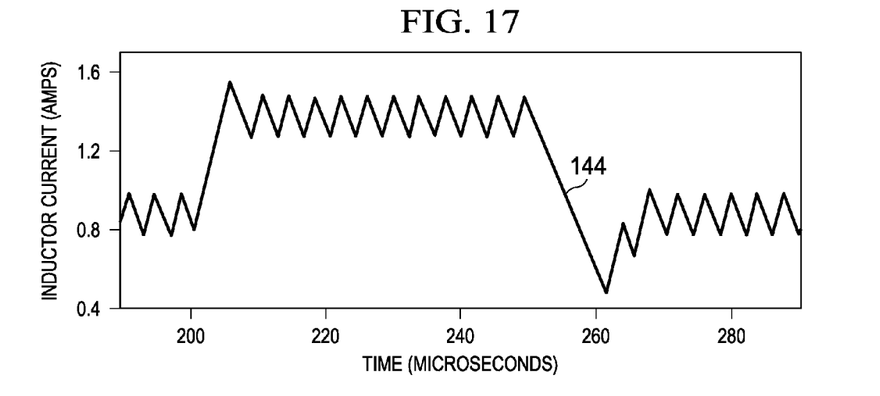
FIG. 17 is another simplified graph of a current in the inductor in the electronic device shown in FIG. 5 according to an embodiment of the present invention.
Figure 18:
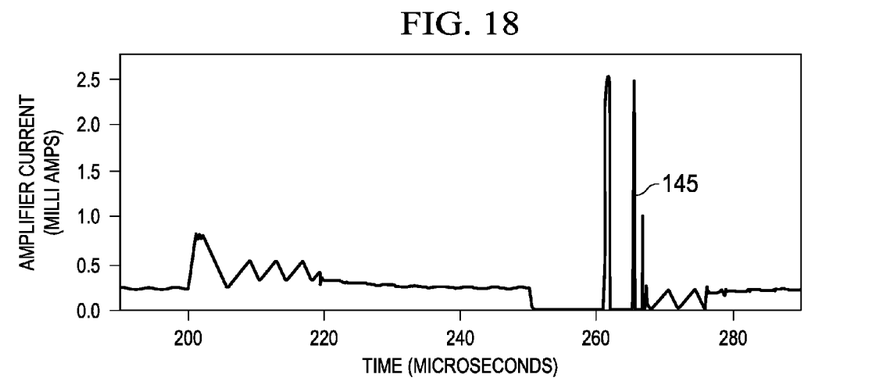
FIG. 18 is another simplified graph of a current in the amplifier in the electronic device shown in FIG. 5 according to an embodiment of the present invention.
Figure 19:
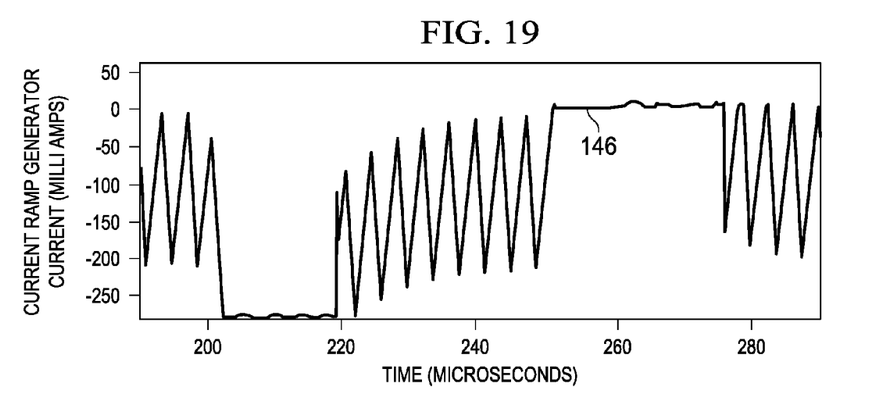
FIG. 19 is another simplified graph of a current in the optional current ramp generator in the electronic device shown in FIG. 5 according to an embodiment of the present invention.
Figure 20:
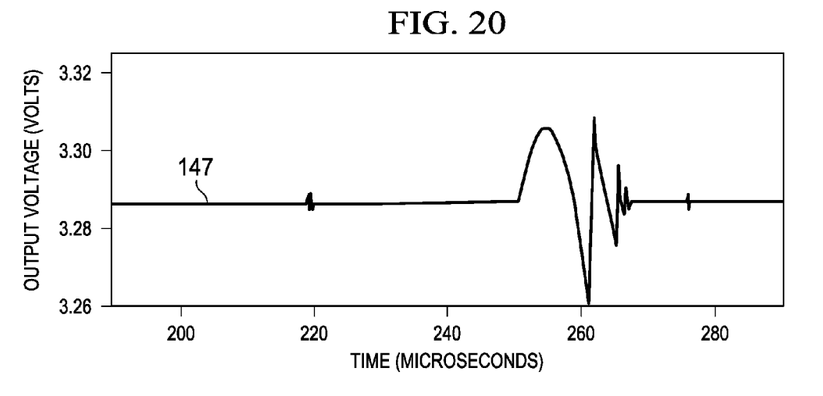
FIG. 20 is another simplified graph of an output voltage for the electronic device shown in FIG. 5 according to an embodiment of the present invention.

In the steady state graphs 139, 140, 141 and 143 (FIGS. 12, 13, 14 and 16, respectively) show that the currents from the inductor 124 (graph 139) and the CRG 130 (graph 141) are almost exactly out of phase with each other during the steady state, and the current from the amplifier 126 (graph 140) makes a fairly minimal contribution. Additionally, the output voltage Vout exhibits very little ripple (about 4.5 microvolts peak-to-peak, or about 0.00014% noise at about 3.29 Volts)

during the steady state, as shown by the high resolution (zoomed-in) vertical scale of graph 143.

FIGS. 17-20 illustrate the results of another simulation performed on a circuit based on another embodiment of the electronic device 120 (FIG. 5) involving typical load transient events, i.e. changes in the current drawn by the output load 110. In this simulation, the output load 110 transitions from about 1.0 Amps to about 1.5 Amps at about the 200 microsecond time point, and transitions back to about 1.0 Amps at about the 250 microsecond time point, both transients occurring within about one microsecond. Graphs 144, 145 and 146 (FIGS. 17, 18 and 19, respectively) show the simulated responses of the currents from the inductor 124, the amplifier 126 and the CRG 130 to these load transients. Additionally, graph 147 (FIG. 20) shows the simulated response of the output voltage Vout to these load transients. The graph 144 shows that the current from the inductor 124 transitions relatively smoothly within about 10-15 microseconds following the load transients. The graph 145 shows that the current from the amplifier 126 undergoes some fluctuations following both load transient events, but settles out within about 20-25 microseconds. (e.g. After the increasing load transient event, the amplifier 126 suddenly has to contribute more current while the inductor 124 takes some time to ramp its current up. (Some current will also come from the output capacitor 125 during this time.) Then after the decreasing load transient event, the amplifier 126 stops contributing current, and the output capacitor 125 absorbs some of the current, while the current in the inductor 124 drains down, until the amplifier 126 has to start pushing current into the output load 110, thereby starting the switching again.) Additionally, the graph 146 shows that the current from the CRG 130 also resumes normal operations within about 20-25 microseconds following both load transient events. The net result, as shown by graph 147, is that the output voltage Vout undergoes almost no perturbations following the increasing load transient event and relatively minor fluctuations following the decreasing load transient event.

Figure 21:
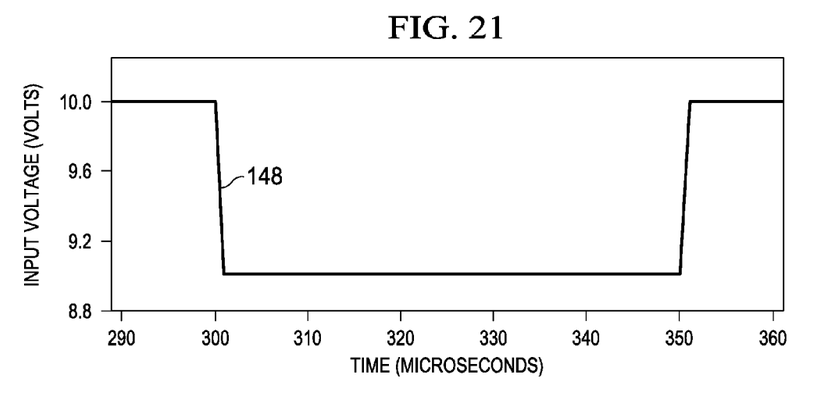
FIG. 21 is a simplified graph of an input voltage to the electronic device shown in FIG. 5 according to an embodiment of the present invention.
Figure 22:
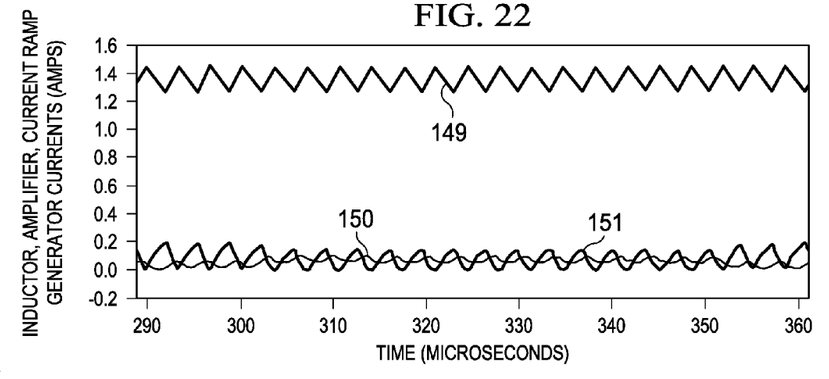
FIG. 22 is additional simplified graphs of currents in the inductor, the amplifier and the optional current ramp generator in the electronic device shown in FIG. 5 according to an embodiment of the present invention.
Figure 23:
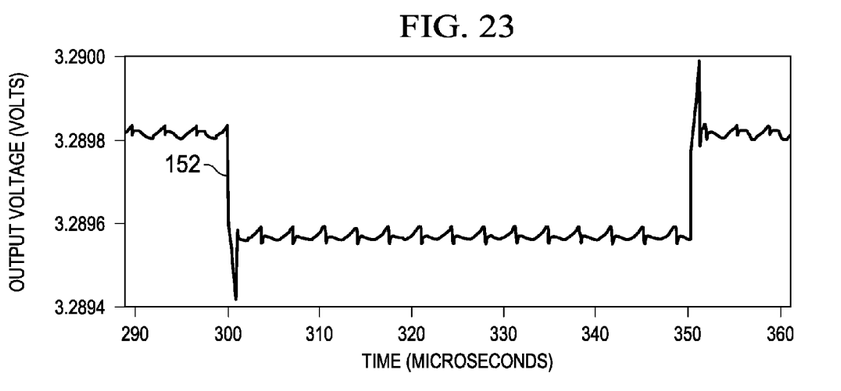
FIG. 23 is another simplified graph of an output voltage for the electronic device shown in FIG. 5 according to an embodiment of the present invention.

FIGS. 21-23 illustrate the results of another simulation performed on a circuit based on another embodiment of the electronic device 120 (FIG. 5) involving typical line transient events, i.e. sudden changes in the input voltage Vin. Graph 148 (FIG. 21) shows the simulated transients of the input voltage Vin, e.g. decreasing from about 10.0 Volts to about 9.0 Volts at about the 300 microsecond time point and increasing back to about 10.0 Volts at about the 350 microsecond time point, both transients occurring within about one microsecond. Graphs 149, 150 and 151 (FIG. 22) show the simulated responses of the currents from the inductor 124, the amplifier 126 and the CRG 130 to these line transient events. The current from the inductor 124 (graph 149) appears almost completely unchanged by either line transient event, while the currents from the amplifier 126 and the CRG 130 (graphs 150 and 151, respectively) appear to transition rapidly and smoothly to new steady state conditions that are only slightly changed from the previous conditions. Additionally, the output voltage Vout (graph 152) also appears to transition rapidly, with only minor overshoots, to a new steady state condition that is only slightly changed from the previous condition. In other words, the ability of the voltage regulator 121 to reject noise on the input voltage Vin is very good.

"Light load" conditions are defined by those operating conditions under which the output load 110 (FIGS. 4 and 5) draws a relatively small current from the voltage regulator 109 or 121. When the current from the amplifier 126 drops to the lower limit, as explained above, the sense resistor 128, the difference amplifier 127 and the comparator 129 operate to turn off the switch 122. However, if the entire output current of the voltage regulator 121 is below the lower limit (e.g. a light load condition), then the current from the amplifier 126 does not reach the point where the switch 122 is turned back on. In this case, therefore, the switching is stopped, and all of the output current comes only from the amplifier 126. Therefore, switching losses are eliminated and the noise level is extremely low in such light load conditions. Switching is resumed when the output load 110 increases sufficiently for the current from the amplifier 126 to rise above the upper limit, at which the sense resistor 128, the difference amplifier 127 and the comparator 129 operate to turn on the switch 122. In this manner, the voltage regulator 109 or 121 transitions cleanly between switching and linear modes. Prior art switching power supplies, on the other hand, change between PWM and PFM or Burst modes at light load transitions, which can generate considerable noise and can cause random switching frequencies.

Figure 24:
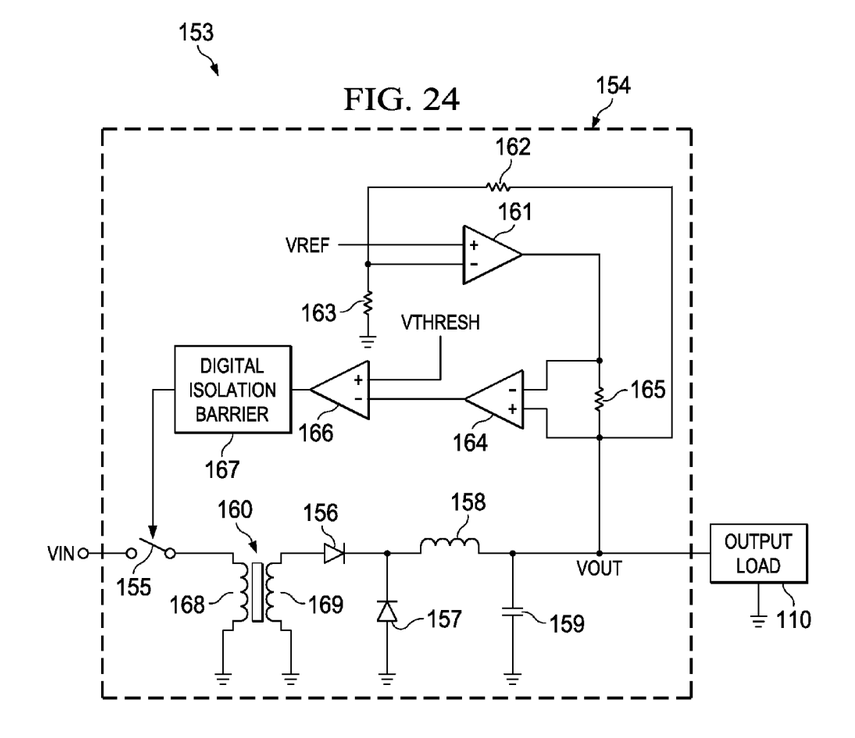
FIG. 24 is a simplified schematic diagram of another specific embodiment of the electronic device shown in FIG. 4 incorporating an embodiment of the present invention.

A more detailed, but still simplified, schematic of an alternative embodiment of the present invention is shown in FIG. 24 as an electronic device 153 having a voltage regulator 154 and the output load 110. In this embodiment, the output switching stage 114 (FIG. 4) is based on an isolated forward converter regulator generally including a switch 155, two diodes 156 and 157, an inductor 158, an output capacitor 159 and a transformer 160. The output control stage 111 generally includes an amplifier 161 (similar to the amplifier 126, FIG. 5) with a reference voltage Vref and a feedback voltage divider (resistors 162 and 163). The current level detector 112 generally includes a difference, or instrumentation, amplifier 164 (similar to the amplifier 127) and a sense resistor 165 (similar to the sense resistor 128). The control circuit 113 generally includes a comparator 166 (similar to the comparator 129) with a threshold voltage Vthresh. The voltage regulator 154 also preferably includes a digital isolation barrier 167. The voltage regulator 154 may also have an optional current ramp generator (not shown, but similar to the optional current ramp generator 130) if needed. Other components or details are not shown for simplicity of explanation. Additionally, other arrangements and combinations of components are possible in variations of this embodiment without departing from the general functions described herein.

In this embodiment, the voltage regulator 154 generally produces an "isolated" output voltage Vout to power the output load 110. The amplifier 161, the difference amplifier 164, the sense resistor 165 and the comparator 166 generally operate as described above for the components 126, 127, 128 and 129, respectively, in response to feedback of the isolated output voltage Vout, in order to control the level of the isolated output voltage Vout with relatively low ripple and relatively high efficiency. (The digital isolation barrier 167 generally provides for a measure of safety in transferring signals and power.) The amplifier 161 preferably sinks current instead of sources current in order to cancel the ripple in the current from the inductor 158 in some variations of this embodiment. When the switch 155 is closed (by operation of the difference amplifier 164, the sense resistor 165 and the comparator 166 in response to the level of the current from the amplifier 161), current in a first winding 168 of the transformer 160 ramps up. When the switch 155 is opened, the energy in the first winding 168 is transferred to a second winding 169 of the transformer 160, and current is sourced through the first diode 156 to ramp up the current in the inductor 158. When the switch 155 is closed again the first winding 168 is again charged, and the current through the inductor 158 comes through the second diode 157, while ramping down.

Presently preferred embodiments of the present invention and its improvements have been described with a degree of particularity. This description has been made by way of preferred example. It should be understood, however, that the scope of the claimed subject matter is defined by the following claims, and should not be unnecessarily limited by the detailed description of the preferred embodiments set forth above.

The invention claimed is:

1. An electronic device comprising:
an output switching stage that produces a first current, the first current contributes a major portion of an output current;
an amplifier connected to the output switching stage, the amplifier receives a feedback of an output voltage and produces a second current that is based on a difference between a reference voltage and the feedback of the output voltage, the second current forms at least part of a counterbalancing current that contributes a minor portion of the output current, the counterbalancing current, combined with the first current, maintains the output voltage at a substantially constant level; and
a current sensor that detects a level of the counterbalancing current;
and wherein the output switching stage is controlled in response to the level of the counterbalancing current, and wherein
the output switching stage is switched on when the counterbalancing current increases to an upper threshold level;
the output switching stage is switched off when the counterbalancing current decreases to a lower threshold level that is below the upper threshold level;
when the output switching stage is switched on, the first current increases and the counterbalancing current decreases;
when the output switching stage is switched off, the first current decreases and the counterbalancing current increases; and
the increasing and decreasing of the first current and the counterbalancing current maintain the output voltage at about a desired voltage level.

2. The electronic device of claim 1, further comprising:
a current ramp generator connected to the amplifier and the output switching stage to produce a third current that forms the counterbalancing current in combination with the second current.

3. The electronic device of claim 1, wherein:
the output switching stage includes a step down Buck regulator.

4. The electronic device of claim 1, wherein:
the output switching stage includes an isolated forward converter regulator.

5. The electronic device of claim 1, wherein:
the output voltage exhibits less than about 0.002% of voltage ripple around a desired voltage level.

6. The electronic device of claim 1, wherein:
the output voltage is produced with an efficiency of greater than 80%.

7. The electronic device of claim 1, wherein:
when the output current is below a light load threshold level, the output switching stage is not switched on.

8. An electronic device comprising:
an output switching stage that produces a first current, the first current contributes a first portion of an output current at an output voltage;
an output control amplifier connected to the output switching stage, the output control amplifier receives a feedback of the output voltage at a negative input and a reference voltage at a positive input, the output control amplifier produces a second current that is relative to a difference between the reference voltage and the feedback of the output voltage, the second current forms at least part of a counterbalancing current that contributes a second portion of the output current, the second portion is smaller than the first portion, the first current and the counterbalancing current alternate ramping up and down substantially out of phase with each other;
a current sensor that detects a level of the counterbalancing current; and
a control circuit connected to the current sensor and the output switching stage to control the output switching stage in response to the detected level of the counterbalancing current, the control circuit and the current sensor are configured to minimize the contribution of the counterbalancing current to the output current, wherein
the output switching stage is switched on when the counterbalancing current increases to an upper threshold level;
the output switching stage is switched off when the counterbalancing current decreases to a lower threshold level that is below the upper threshold level;
when the output switching stage is switched on, the first current increases and the counterbalancing current decreases;
when the output switching stage is switched off, the first current decreases and the counterbalancing current increases; and
the increasing and decreasing of the first current and the counterbalancing current maintain the output voltage at about a desired voltage level.

9. The electronic device of claim 8, further comprising:
a current ramp generator connected to the output switching stage to be activated and deactivated in response to the output switching stage being deactivated and activated, respectively, the current ramp generator produces a third current, the second and third currents form the counterbalancing current.

10. The electronic device of claim 8, wherein:
the output voltage exhibits less than 50 micro Volts of voltage ripple around a desired voltage level.

11. The electronic device of claim 8, wherein:
the output voltage is produced with an efficiency of greater than 80%.

12. A method comprising:
generating a first current by an output switching stage, the first current exhibits a ripple and contributes a major portion of an output current;
generating a second current by an amplifier based on a difference between an output voltage and a reference voltage, the second current contributes a minor portion of the output current and exhibits a counterbalancing ripple that, combined with the ripple of the first current, maintains the output voltage at a substantially constant level;
controlling the output switching stage to increase the first current in response to detecting a level of a detected current above a first level, the second current forms at least a part of the detected current; and
controlling the output switching stage to decrease the first current in response to detecting the level of the detected current below a second level;

switching the output switching stage on when the counterbalancing current increases to an upper threshold level so that the first current increases and the counterbalancing current decreases;

switching the output switching stage off when the counterbalancing current decreases to a lower threshold level that is below the upper threshold level so that the first current decreases and the counterbalancing current increases;

wherein the increasing and decreasing of the first current and the counterbalancing current maintain the output voltage at about a desired voltage level.

13. The method of claim 12, further comprising:
generating a third current by a current ramp generator, the third current contributes a second minor portion of the output current, forms the detected current with the second current and exhibits a second counterbalancing ripple that, combined with the ripples of the first and second currents, maintains the output voltage at the substantially constant level.

14. The method of claim 13, further comprising:
upon increasing the first current, decreasing the third current; and
upon decreasing the first current, increasing the third current;
and wherein the generation of the first, second and third currents maintains the output voltage at the substantially constant level.

15. The method of claim 12, further comprising:
providing a step down Buck regulator for the output switching stage.

16. The method of claim 12, further comprising:
providing an isolated forward converter regulator for the output switching stage.

17. The method of claim 12, further comprising:
maintaining the output voltage with less than 50 micro Volts of voltage ripple around a desired voltage level.

18. The method of claim 12, further comprising:
producing the output voltage with an efficiency of greater than 80%.

19. The method of claim 12, further comprising:
when the output current is below a light load threshold level, controlling the output switching stage to maintain it turned off.

* * * * *